United States Patent
Nicolini

(10) Patent No.: US 7,823,606 B2
(45) Date of Patent: Nov. 2, 2010

(54) DEVICE FOR ADJUSTING AND THROTTLING THE FLOW-RATE OF A FLUID, PARTICULARLY MEDICAL OXYGEN AND COMPRESSED GASES IN GENERAL

(75) Inventor: Giancarlo Nicolini, Villanuova Sul Clisi (IT)

(73) Assignee: Pergola S.R.L., Calcinato (IT)

( * ) Notice: Subject to any disclaimer, the term of this patent is extended or adjusted under 35 U.S.C. 154(b) by 555 days.

(21) Appl. No.: 11/898,088

(22) Filed: Sep. 10, 2007

(65) Prior Publication Data

US 2008/0066817 A1 Mar. 20, 2008

(30) Foreign Application Priority Data

Sep. 18, 2006 (EP) .................................. 06425642

(51) Int. Cl.
*F16K 17/04* (2006.01)
(52) U.S. Cl. .................... 137/887; 137/878; 137/559
(58) Field of Classification Search ............ 137/614.11, 137/559, 877, 878, 887; 251/205–209
See application file for complete search history.

(56) References Cited

U.S. PATENT DOCUMENTS

| | | | | |
|---|---|---|---|---|
| 4,643,215 A | * | 2/1987 | Phlipot et al. | .......... 137/614.11 |
| 5,246,201 A | | 9/1993 | Messick | |
| 5,640,997 A | | 6/1997 | Reed et al. | |
| 6,962,167 B2 | | 11/2005 | Rogalski et al. | |

FOREIGN PATENT DOCUMENTS

GB 199 915 A 7/1923

* cited by examiner

*Primary Examiner*—Kevin L Lee
(74) *Attorney, Agent, or Firm*—Modiano & Associati; Albert Josif; Daniel J. O'Byrne

(57) ABSTRACT

A device for adjusting and throttling the flow-rate of a fluid, particularly medical oxygen and compressed gases in general, which comprises a valve body which defines an input port and an output port for a fluid at high pressure; the input port is controlled by a high-pressure flow control element; an input duct is also provided for a low-pressure fluid which is connected to a rotating body with a control port which can be arranged at the calibrated holes provided in an adjustment disk and connected to at least one output duct; a single actuation handwheel is further provided which drives the high-pressure flow control element and the rotating body.

14 Claims, 3 Drawing Sheets

DEVICE FOR ADJUSTING AND THROTTLING THE FLOW-RATE OF A FLUID, PARTICULARLY MEDICAL OXYGEN AND COMPRESSED GASES IN GENERAL

The present invention relates to a device for adjusting and throttling the flow-rate of a fluid, particularly medical oxygen and compressed gases in general.

BACKGROUND OF THE INVENTION

As is known, devices are currently commercially available which adjust the flow-rate of a fluid, particularly medical oxygen, by using a disk with calibrated holes which are connected to the user device in each instance.

Such devices are generally arranged downstream of a pressure reduction unit, which must be provided with a means for throttling the high-pressure flow of fluid.

Several drawbacks are currently encountered with the solutions of the background art: one is the fact that it is necessary to provide two separate elements, i.e., the pressure reduction unit, with its corresponding flow control element, and the flow-rate adjustment device with its actuation handwheel, thus causing problems in use and problems in terms of space occupation due to the presence of two separate elements.

Another problem further consists in that the disks with calibrated holes, which typically rotate with respect to the port that controls the flow of the low-pressure fluid, can be subject to deformations, since in order to try to optimize the precision of the holes it is necessary to use relatively low thicknesses.

Another problem further consists in that in the solutions of the background art, when changing the flow-rate, the output port for the passage of the fluid may accidentally arrange itself in a region which does not allow the passage of the fluid, with consequent severe risks for the patient.

SUMMARY OF THE INVENTION

The aim of the invention is to eliminate the drawbacks described above by providing a device for adjusting and throttling the flow-rate of a fluid, particularly medical oxygen, which allows to incorporate therein two separate functions, simplifying both the structure and the actuation of the device.

Within this aim, a particular object of the invention is to provide a device in which there is always the absolute certainty of not arranging the actuation handwheel in regions where the flow of the fluid accidentally does not occur, thus contributing to greater safety of the assembly.

Another object of the present invention is to provide a device which thanks to its particular constructive characteristics is capable of giving the greatest assurances of reliability and safety in use.

Still another object of the present invention is to provide a device for adjusting and throttling the flow-rate of a fluid, particularly medical oxygen, which can be obtained easily starting from commonly commercially available elements and materials and is also competitive from a merely economical standpoint.

This aim and these and other objects, which will become better apparent hereinafter, are achieved by a device for adjusting and throttling the flow-rate of a fluid, particularly medical oxygen, characterized in that it comprises a valve body which defines an input port and an output port for a fluid at high pressure, said input port being controlled by a high-pressure flow control element, an input duct for a low-pressure fluid being further provided which is connected to a rotating body with a control port which can be arranged at the calibrated holes provided in an adjustment disk and connected to at least one output duct, a single actuation handwheel being further provided which drives said high-pressure flow control element and said rotating body.

BRIEF DESCRIPTION OF THE DRAWINGS

Further characteristics and advantages will become better apparent from the description of a preferred but not exclusive embodiment of a device for adjusting and throttling the flow-rate of a fluid, particularly medical oxygen, illustrated by way of non-limiting example in the accompanying drawings, wherein.

DESCRIPTION OF THE PREFERRED EMBODIMENTS

Figure 1:
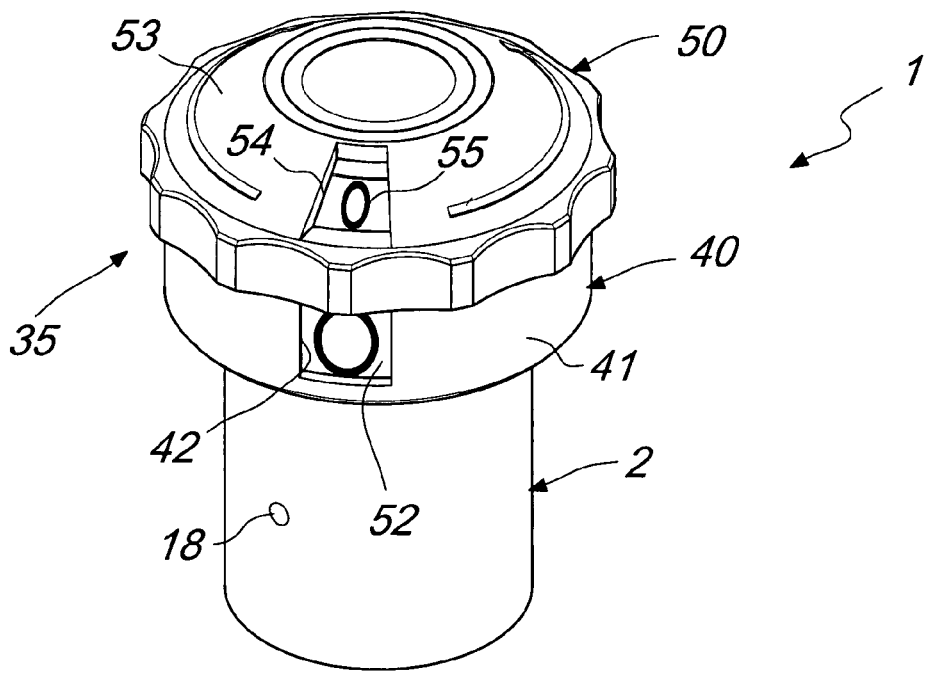
FIG. 1 is a schematic perspective view of the device for adjusting and throttling the flow-rate of a fluid according to the invention.
Figure 3:
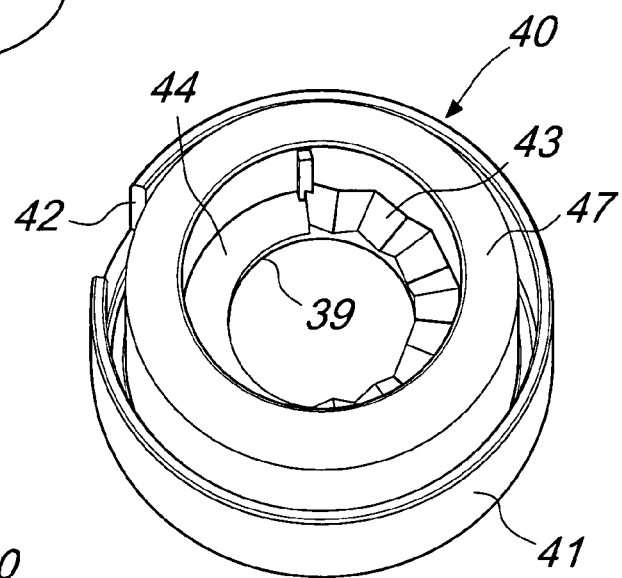
FIG. 3 is a top perspective view of the lower portion of the actuation handwheel.
Figure 4:
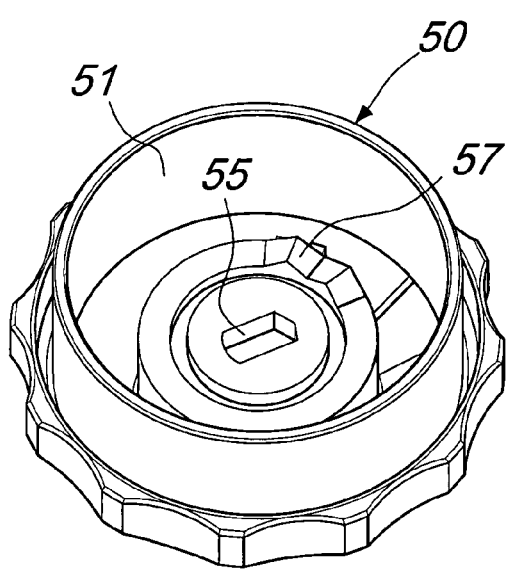
FIG. 4 is a perspective view of the upper portion of the actuation handwheel, arranged upside down.
Figure 2:
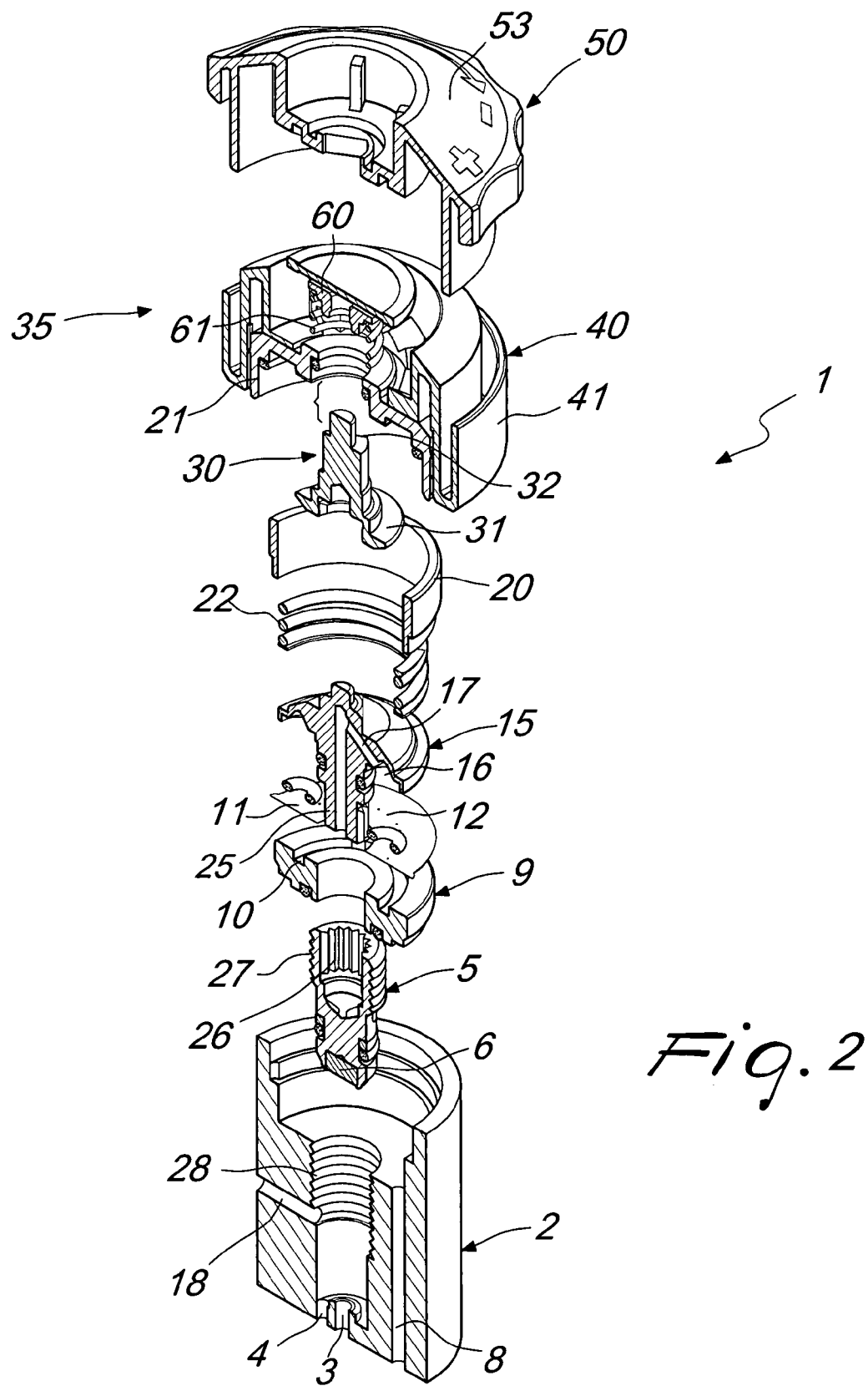
FIG. 2 is an exploded perspective view of the device.
Figure 6:
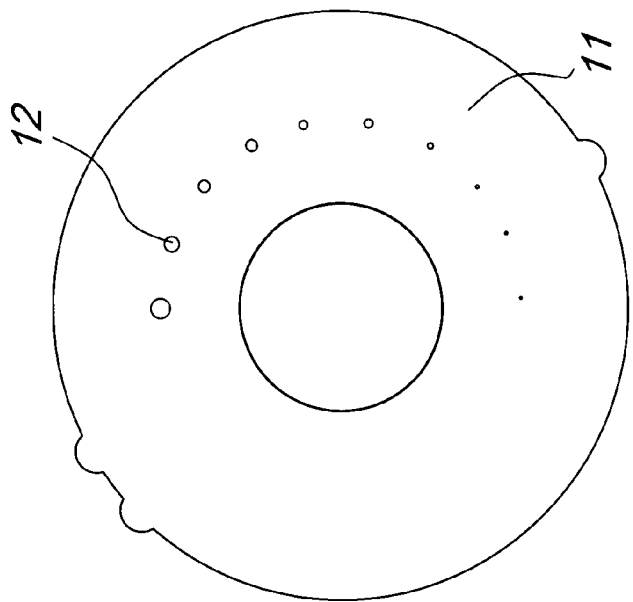
FIG. 6 is a view of the adjustment disk.
Figure 5:
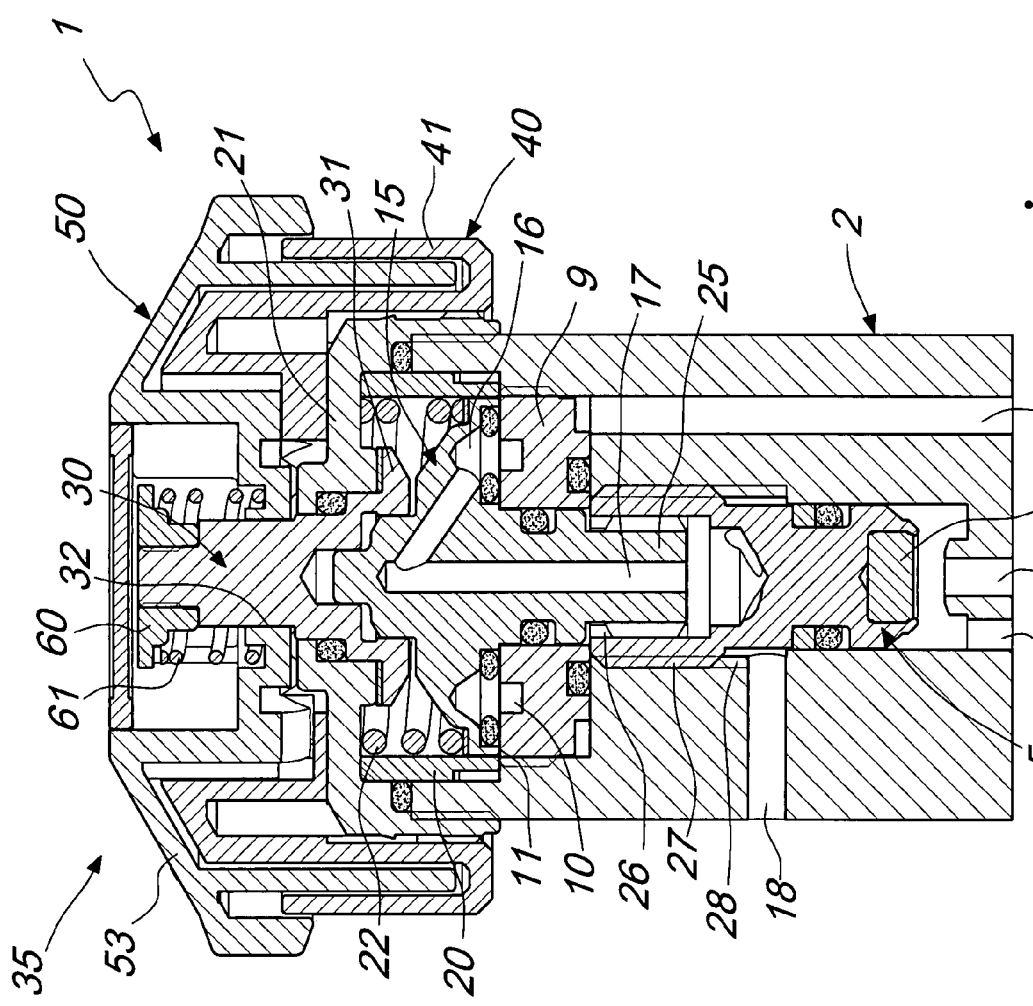
FIG. 5 is a diametrical sectional view of the device.

With reference to the figures, the device for adjusting and throttling the flow-rate of a fluid, particularly medical oxygen, generally designated by the reference numeral 1, comprises a valve body 2 which defines in a downward region a port 3 for the inflow of a pressurized fluid, which is flanked by a port 4 for the outflow of the pressurized fluid.

The port 3 is controlled by a high-pressure flow control element 5, provided with a sealing gasket 6 which can be arranged hermetically on the high-pressure input port 3.

The high-pressure fluid enters the port 3 and, if the gasket 6 is in a spaced position, is sent to the pressure reduction unit by way of the high-pressure output port 4; from the pressure reduction unit, the fluid is fed into an input duct 8 defined in the valve body 2; the low-pressure fluid, by way of a connecting body 9, is introduced in a manifold 10 which is provided in the body 9 and has a circular shape.

A fixed disk 11, with calibrated holes 12 arranged correspondingly with respect to the circular manifold 10, is positioned above the connecting body 9; the disk 11 has a low thickness of less than one tenth of a millimeter.

A rotating body 15 acts on the disk 11 and is provided with a control port 16 equipped with an O-ring gasket 16a, which is arranged at the region affected by the calibrated holes and is connected to an internal output duct 17, which, by passing through the flow control element 5, connects to the output duct 18.

The calibrated disk 11 is kept in position by means of a spacer 20, which is clamped by means of a cap 21 on which a compression spring 22 acts which pushes, so as to form a seal, the face of the rotating body which engages the disk 11 with calibrated holes 12.

Gaskets which are similar to the ones that affect the port 16 and merely have a balancing function can be arranged symmetrically on the rotating body.

The rotating body defines a shank 25, which engages polygonally an axial cavity 26 provided in the flow control element 5 which is provided with a male thread 27 which engages a corresponding female thread 28 defined by the valve body in order to produce the translational motion of the flow control element 5 when the rotating body turns.

In an upward region, the rotating body rigidly rotationally engages a shaft 30 provided with a lower flange 31, which arranges itself below the cap 21 and defines an upper engagement element or contoured portion 32 for engagement with an actuation handwheel, generally designated by the reference numeral 35.

The actuation handwheel 35 has the important function of actuating both the high-pressure flow control element 5 and the rotating flow-rate adjustment body.

For this purpose, the actuation handwheel 35 is provided by means of a lower portion 40, which is fixed with respect to the valve body in order to engage an internal set of teeth thereof with an external set of teeth provided on the cap so as to prevent relative rotation.

The lower portion 40 defines an outer border 41 with a window 42 for viewing an indication related to the flow-rate which is located, as will become better apparent hereinafter, on the upper portion of the actuation handwheel.

The lower portion 40 has an internal flange 39 which allows the passage of the shaft 30 with the possibility of rotation.

A portion of a front set of teeth 43 is provided on the upper face of the flange 39 and affects only a portion of the circumferential extension so as to leave a free region 44 on the flange 39.

An upper portion 50 engages the lower portion 40 and forms a cylindrical side wall 51, which enters the outer border 41 and bears indications 52 related to the flow-rate which are visible on the side wall.

Correspondingly, an upper window 54 is provided in the upper frustum-shaped portion 53 of the upper portion 50, and flow-rate indications 55 provided on the upper inclined portion 47 of the lower portion 40 can be viewed through said window.

In a central region, the upper part 50 has a contoured hole 51 which engages the contoured portion 32 of the shaft 30, so that the upper portion rotates rigidly with the shaft 30 but can perform an axial translational motion.

It should be specified that the coupling of the actuation handwheel is achieved by means of a ring 60, which screws onto the upper end of the shaft 30 and acts on the end of a pusher spring 61 which acts on the upper portion 50 of the handwheel in order to push it against the lower portion of said handwheel.

In the central region, the upper portion 50 has front teeth 57 which engage the front set of teeth 43 so as to always define stable positions in which the port 16 is located at a calibrated hole in order to prevent the accidental interruption of the flow.

With the described arrangement, by acting on the handwheel 35 in the initial portion in which the teeth 57 engage the free portion 44 of the lower portion of the handwheel, the high-pressure flow control element 5 is actuated, allowing its opening or closure.

By continuing the rotation, due to the engagement between the teeth 57 and the set of teeth 43, a succession of stable positions is achieved in which the port 16 arranges itself at least one of the calibrated holes, thus achieving a precise flow-rate adjustment.

From what has been described above, it is therefore evident that the invention achieves the intended aim and objects, and in particular the fact is stressed that a device is provided in which the actuation handwheel, in a first portion of rotation, allows to act on the high-pressure flow control (throttling) element, and, by continuing the rotation, when the sets of teeth engage, the stable positions that correspond to the different flow-rates are achieved.

Another important aspect further consists in that the flow-rates can be viewed both on the outer border and in an upward region, thus allowing optimum viewing of the flow-rate.

It should also be noted that with the solution described above, with a single device and with a single actuation element, flow control or throttling of the high-pressure fluid for sending it to the pressure reduction unit is achieved.

The invention thus conceived is susceptible of numerous modifications and variations, all of which are within the scope of the inventive concept.

All the details may further be replaced with other technically equivalent elements.

In practice, the materials used, as well as the contingent shapes and dimensions, may be any according to requirements.

The disclosures in EPA No. 06425642.3 from which this application claims priority are incorporated herein by reference.

What is claimed is:

1. A device for adjusting and throttling the flow-rate of a fluid, comprising a valve body which defines an input port and an output port for a fluid at high pressure, said input port being controlled by a high-pressure flow control element, an input duct for a low-pressure fluid being further provided which is connected to a rotating body with a control port which can be arranged at calibrated holes provided in an adjustment disk and connected to at least one output duct, a single actuation handwheel being further provided which drives said high-pressure flow control element by first rotation of said single actuation handwheel, and which drives said rotating body by a second rotation of said single actuation handwheel subsequent to said first rotation.

2. The device according to claim 1, wherein said adjustment click has a fixed position.

3. The device according to claim 1, wherein said adjustment disk has a thickness of less than one tenth of a millimeter.

4. The device according to claim 1, wherein said high-pressure flow control element comprises a male thread which can engage a corresponding female thread defined by said valve body for the translational motion of said high-pressure flow control element.

5. The device according to claim 1, wherein said actuation handwheel comprises a lower portion, which is fixed on said valve body, and an upper portion, which rotates rigidly with said rotating body and engages, with axial sliding and rotation, said lower portion.

6. The device according to claim 5, further comprising a ring which is connected to said shaft and acts, by means of a pusher spring, on said upper portion of said handwheel in order to push said upper portion against said lower portion.

7. The device according to claim 5, wherein said upper portion has a front set of teeth which affects only a circumferential portion and can engage front teeth in order to define stable positions in the portion for engagement between said front teeth and said portion of the front set of teeth.

8. The device according to claim 7, wherein said front teeth engage the free region which is laterally adjacent to said portion of the front set of teeth during the portion of the rotation of said actuation handwheel which is adapted to open and close said high-pressure flow control element.

9. The device according to claim 5, wherein said lower portion defines an outer border with a window for viewing an indication related to the flow-rate which is provided on a cylindrical side wall of said upper portion.

10. The device according to claim 5, wherein said upper portion is provided in an upward region with an upper slot, through which it is possible to view flow-rate indications provided correspondingly on the upper inclined portion of said lower portion.

11. A device for adjusting and throttling the flow-rate of a fluid, comprising a valve body which defines an input port and an output port for a fluid at high pressure, said input port being controlled by a high-pressure flow control element, an input duct for a low-pressure fluid being further provided which is connected to a rotating body with a control port which can be arranged at calibrated holes provided in an adjustment disk and connected to at least one output duct, a single actuation handwheel being further provided which drives said high-pressure flow control element and said rotating body, and further comprising a spacer for fixing said adjustment disk which can be positioned by means of a cap which can be coupled to said valve body.

12. The device according to claim 11, further comprising a compression spring which acts between said cap and said rotating body arranged on said adjustment disk.

13. The device according to claim 11, further comprising a shaft which is provided with a lower flange for engagement with said cap and engages rigidly rotationally said rotating body, said shaft engaging rigidly rotationally said actuation handwheel.

14. A device for adjusting and throttling the flow-rate of a fluid, comprising a valve body which defines an input port and an output port for a fluid at high pressure, said input port being controlled by a high-pressure flow control element, an input duct for a low-pressure fluid being further provided which is connected to a rotating body with a control port which can be arranged at calibrated holes provided in an adjustment disk and connected to at least one output duct, a single actuation handwheel being further provided which drives said high-pressure flow control element and said rotating body, and said rotating body having a shank which can rigidly rotationally engage, with axial sliding, an axial cavity defined by said flow control element.

* * * * *